United States Patent [19]

Bayard et al.

[11] Patent Number: 5,686,534

[45] Date of Patent: Nov. 11, 1997

[54] INITIATION SYSTEM FOR THE ANIONIC POLYMERISATION OF (METH)ACRYLIC MONOMERS

[75] Inventors: Philippe Bayard, Stavelot; Roger Fayt; Philippe Teyssie, both of Neuville en Condroz, all of Belgium; Sunil K. Varshney, Verdun, Canada; Bruno Vuillemin; Philippe Heim, both of Pau, France

[73] Assignee: Elf Atochem S.A., Puteaux, France

[21] Appl. No.: 306,524

[22] Filed: Sep. 15, 1994

Related U.S. Application Data

[62] Division of Ser. No. 159,711, Dec. 1, 1993, abandoned, which is a continuation of Ser. No. 914,567, Jul. 17, 1992, abandoned.

[30] Foreign Application Priority Data

Jul. 19, 1991 [FR] France .................... 91 09172

[51] Int. Cl.$^6$ ................................. C08F 297/02
[52] U.S. Cl. .................. 525/271; 525/299; 525/250; 526/174; 526/175
[58] Field of Search ................... 525/250, 248, 525/271, 272; 526/174, 175

[56] References Cited

U.S. PATENT DOCUMENTS 3,285,894  11/1966  Lim et al. ................. 526/175

FOREIGN PATENT DOCUMENTS

| 402219 | 12/1990 | European Pat. Off. . |
| 408429 | 1/1991 | European Pat. Off. . |
| 1428476 | 1/1966 | France . |
| 138069 | 10/1979 | Germany . |
| 1003543 | 9/1965 | United Kingdom . |

OTHER PUBLICATIONS

D. M. Wiles et al., *Effect of Lithium Alkoxides*, The Butyl-lithium–Initiated Polymerization of Methyl Methacrylate, vol. 68, No. 7, Jul. 1964. pp. 1983–1987.

K F Purcell & J C Kotz Inorganic Chemistry, W B Saunders 1977 Philadelphia, p. 832.

G. Odian, "Principles of Polymerization," 2d Ed. pp. 372–380, Wiley, New York, (1981).

J. March, "Advanced Organic Chemistry," 4th Ed., pp. 17–23 and 263–269, Wiley, New York (1992).

AJ Gordon and RA Ford, "The Chemists Companion," pp. 107–108, 111–112, Wiley, New York (1972).

Fieser, LF et al. Reagents for Organic Synthesis, Wiley, New York, 1967, pp. 711–712.

*Primary Examiner*—Mark Nagumo
*Attorney, Agent, or Firm*—Burns, Doane, Swecker & Mathis, L.L.P.

[57] ABSTRACT

An initiation system for the anionic polymerization of (meth)acrylic monomers and, optionally, nonacrylic vinyl monomers is disclosed. The initiation system comprises (1) a functional initiator and (2) an alkali metal alcoholate having the formula R'OM', in which M' is an alkali metal and R' is a group $R^1(OR^2)_m$ where $R^1$ is a $C_1$–$C_6$ alkyl or arylalkyl radical, $R^2$ is a $C_2$–$C_4$ alkylene radical and m is equal to 1, 2 or 3. The initiation system is applied to the formation of (meth)acrylic homopolymers and block copolymers of (meth)acrylic monomers and, optionally, nonacrylic vinyl comonomers.

19 Claims, No Drawings

INITIATION SYSTEM FOR THE ANIONIC POLYMERISATION OF (METH)ACRYLIC MONOMERS

This application is a divisional of application Ser. No. 08/159,711, filed Dec. 1, 1993 (now abandoned), which is a continuation of application Ser. No. 07/914,567, filed Jul. 17, 1992 (now abandoned).

The present invention relates to an initiation system for the anionic polymerisation of methacrylic monomers, acrylic monomers and optionally nonacrylic vinyl comonomers.

It can be employed in particular for the initiation of acrylic monomers in which the carbon α to the ester oxygen is tertiary, secondary and, above all, primary. In what follows we shall refer to primary, secondary or tertiary acrylates.

It also relates to the use of such an initiation system for the preparation, using anionic polymerisation, of diblock and triblock acrylic copolymers and of star-shaped block copolymers in which one block may originate from a nonacrylic vinyl monomer.

Patent EP-A-402,219 describes an initiation system for the anionic polymerisation of (meth)acrylate, and, optionally, of vinyl comonomers; this initiation system comprises (1) at least one initiator of formula R-M in which M denotes a metal chosen from alkali and alkaline-earth metals and R denotes an alkyl radical with a straight or branched chain containing from 2 to 6 carbon atoms or an aryl or arylalkyl radical and (2) at least one alkali metal alcoholate of formula $R_1OM_1$ where $R_1$ is an alkyl radical with a straight or branched chain containing from 1 to 6 carbon atoms or an aryl or arylalkyl radical and $M_1$ denotes an alkali metal, on condition that, when $M_1$ is lithium, R denotes an aryl or arylalkyl radical.

This initiation system makes it possible to obtain, in satisfactory (at least 70%) yields, by anionic polymerisation, homopolymers of primary alkyl acrylates which have a number-average molecular mass of approximately between 2000 and 200,000 and a molecular mass polydispersity value (defined as the ratio of the weight-average molecular mass to the number-average molecular mass Mw/Mn and determined by exclusion chromatography) which is generally approximately between 1.2 and 3.5.

The initiation system described in this Patent EP-A-402, 219 also makes it possible to manufacture, by anionic polymerisation in 100% yields, polymers of methacrylic monomers, particularly of methyl methacrylate, which have a number-average molecular mass which is generally approximately between 7000 and 150,000 and a polydispersity-value of approximately between 1.05 and 2.0. These polymethacrylates are not crosslinked and generally contain up to 60% of isotactic triads, from 5 to 50% of heterotactic triads and from 22 to 60% of syndiotactic triads.

The initiation system defined in the abovementioned patent also makes it possible to prepare diblock copolymers of A-B structure in which A denotes a block of methacrylic or secondary or tertiary alkyl acrylate monomer or vinylaromatic monomer, preferably a tertiary acrylate or vinylaromatic block, and B denotes a primary alkyl acrylate block, the number-average molecular weight of block A being approximately between 2000 and 300,000, the number-average molecular weight of block B being approximately between 2000 and 200,000 and the polydispersity value of the diblock copolymer being approximately between 1.2 and 2.2.

In some cases it is possible with the initiation system described in the abovementioned patent to obtain primary alkyl acrylate homopolymers such as those of n-butyl acrylate, in a good yield and with a polydispersity of 1.2 to 3.5. However, attempts are made to obtain homopolymers in a high yield and with a lower polydispersity in order, for example, then to obtain functionalised polymers in a good yield.

Moreover, the primary acrylate homopolymer exhibits a lower glass transition temperature than does the analogous tertiary acrylate homopolymer. It is therefore of interest from the viewpoint of the elastomeric nature. However, the elastomeric homopolymer by itself does not have good mechanical properties. Only the block copolymers containing a block of this elastomer are of interest, the other blocks having in particular a high glass transition temperature (>100° C.).

What is therefore particularly sought after is that this primary acrylate homopolymer should remain living after the polymerisation so as to be capable of generating, by virtue of its existence, a block copolymer when another methacrylic or nonacrylic vinyl monomer is added.

With regard to alkyl methacrylate homopolymers, the initiation system described in Patent EP-A-402,219 enables them to be obtained in excellent yields, since, as shown by the examples, these reach 100%. However, these polymers contain from 25 to 60% of syndiotactic triads. Now, it is known that the syndiotactic nature of the methacrylate polymer affects its glass transition temperature.

It is known that attempts are made to obtain methacrylate polymers which have a high glass transition temperature endowing them, in particular, with good heat-resistance properties.

Moreover, while the initiation system described in Patent EP-A-402,219 makes it possible to obtain, in high yields, solid diblock copolymer of high molecular weight, combining a primary alkyl acrylate block with an alkyl methacrylate, secondary or tertiary alkyl acrylate or vinylaromatic monomer block, this being without the disadvantages which result especially from unfavourable kinetics of the alkyl methacrylate polymerisation stage, it is linked with a specific preparation process, in the sense that the anionic polymerisation of monomer A (that is to say of methacrylic or secondary or tertiary alkyl acrylate monomer or of vinylaromatic monomer) is carried out, necessarily in a first stage, so as to obtain a living chain unit of the polymer A block, and then, in a second stage, the living chain thus obtained is reacted with monomer B (primary alkyl acrylate).

With such an initiation system it is not possible to obtain a living polymer block from a primary alkyl acrylate. Thus, the variety of block polymers which can be obtained is limited to a structure of the A-B type, as defined above.

This presents a problem particularly when it is desired to prepare triblock or star-shaped polymers with special properties, comprising, for example, a flexible middle block (primary alkyl acrylate) and hard blocks (methyl methacrylate) at the ends, which are useful as thermoplastic elastomers or as additives in pressure-sensitive adhesive formulations.

The objective of the present invention is therefore a new initiation system for the anionic polymerisation of (meth) acrylic monomers and optionally nonacrylic vinyl comonomers, which result especially in the preparation:
  of primary alkyl acrylate polymers with a polydispersity as low as 1.05 and which are living ones;
  of alkyl methacrylate polymers which have a high percentage of syndiotactic triads and are obtained in a nonpolar medium;

of block copolymers combining primary alkyl acrylate blocks with blocks of a methacrylic or secondary or tertiary alkyl acrylate monomer or of nonacrylic vinyl monomer. More particularly, the invention is aimed at obtaining diblock polymethyl methacrylate-b-primary polyacrylate copolymers which are particularly advantageous from an industrial viewpoint, in a better yield and with a better polydispersity when compared with those obtained in the case of Patent EP-A-402,219.

The initiation system according to the invention, for the anionic polymerisation of (meth)acrylic monomers and optionally nonacrylic vinyl comonomers, comprises (1) at least one functional initiator and (2) an alkali metal alcoholate, and is characterised in that the alcoholate has the formula R'OM' in which M' is an alkali metal and R' has the formula:

in which $R^1$ is a linear or branched alkyl radical containing from 1 to 6 carbon atoms or an arylalkyl radical, $R^2$ is a linear or branched alkylene radical containing from 2 to 4 carbon atoms, and m is the integer 1, 2 or 3.

The radical $R^1$ may be the methyl, ethyl, butyl or benzyl radical. $R^1$ is advantageously the methyl radical. The radical $R^2$ may be the ethylene, propylene, butylene or isopropylene radical; it is preferably the ethylene radical. M' is lithium, sodium or potassium, and preferably denotes lithium. m is preferably equal to 2.

The initiator of the initiation system according to the invention may be any known mono- or difunctional initiator.

The monofunctional initiator may be chosen especially from the compounds of formula:

in which:

M denotes an alkali or alkaline-earth metal (valency p of 1 or 2); and

R denotes an alkyl radical with a straight or branched chain containing 2 to 6 carbon atoms, or an aryl radical, optionally substituted, or an alkyl radical containing 1 to 6 carbon atoms, substituted by at least one phenyl group.

Such monofunctional initiators are, for example, sec-butyllithium, n-butyllithium, alpha-methylstyryllithium, 1,1-diphenylhexyllithium, diphenylmethyllithium $(Ph)_2$ CHLi or -sodium or -potassium and 1,1-diphenyl-3-methylpentyllithium.

The difunctional initiator may be chosen especially from compounds such as 1,1,4,4-tetraphenyl-1,4-dilithiobutane (TPDLB), 1,1,4,4-tetraphenyl-1,4-disodiobutane, naphthalenelithium, naphthalenesodium, naphthalenepotassium and their homologues.

The molar ratio of the alkali metal alcoholate to the initiator in the initiation system according to the invention may vary within very wide limits.

The quantity of alcoholate must be sufficient to permit the formation of a complex with the active polymerisation centre and thus to stabilise the latter. The quantity of alcoholate depends on the chosen initiator and on the monomer(s) to be polymerised. The alcoholate/initiator molar ratio according to the invention is between 1 and 50.

In order for the best results to be obtained, this ratio is preferably between 5 and 10.

The initiation system according to the invention is particularly useful for the polymerisation of acrylic monomers (primary, secondary or tertiary alkyl acrylates) and of methacrylic monomers.

It can also be employed for preparing diblock, triblock or star-shaped acrylic copolymers, joining acrylic blocks and, optionally, nonacrylic vinyl monomers, such as butadiene, isoprene and vinylaromatic monomers.

The polymerisation carried out in the presence of the initiation system according to the invention preferably takes place in the absence of moisture and oxygen, and in the presence of at least one polar or nonpolar nonprotic solvent preferably chosen from benzene, toluene, tetrahydrofuran, diglyme, tetraglyme, ortho-terphenyl, biphenyl, decalin or tetralin.

The polymerisation temperature may vary approximately between −100° C. and +60° C. and is preferably lower than approximately −40°C.

The initiation system according to the invention is useful for the polymerisation of primary alkyl acrylate. A primary alkyl acrylate within the meaning of the present invention is intended to mean those in which the alkyl group, substituted, if appropriate, by at least one halogen atom such as chlorine or fluorine, contains from 1 to 18 carbon atoms, more particularly methyl acrylate, ethyl acrylate, n-propyl acrylate, n-butyl acrylate, isobutyl acrylate, n-hexyl acrylate, 2,2,2-trifluoroethyl acrylate, 2-ethylhexyl acrylate, lauryl acrylate or stearyl acrylate.

It is possible, in particular, to obtain, in high yields, primary alkyl acrylate homopolymers which have a number-average molecular mass (Mn) of between 1000 and 200,000 and a molecular mass polydispersity value (Mw/Mn) of between 1.05 and 3.30. These are living homopolymers, and this allows block polymers to be prepared.

The initiation system is also useful for the polymerisation of secondary or tertiary alkyl acrylate, such as isopropyl, sec-butyl or tert-butyl acrylates, of methacrylic monomers.

A methacrylic monomer within the meaning of the present invention is intended to mean a monomer chosen from alkyl methacrylates in which the alkyl radical, substituted if appropriate, for example by at least one halogen atom such as chlorine or fluorine, contains 1 to 18 carbon atoms, such as methyl, ethyl, 2,2,2-trifluoroethyl, n-propyl, isopropyl, n-butyl, sec-butyl, tert-butyl, n-amyl, isoamyl, hexyl, 2-ethylhexyl, cyclohexyl, octyl, isooctyl and decyl methacrylates, as well as glycidyl methacrylate, norbornyl methacrylate, methacrylonitrile and dialkylmethacrylamides.

A vinylaromatic monomer within the meaning of the present invention is intended to mean an aromatic monomer containing ethylenic unsaturation, such as styrene, vinyltoluene, alpha-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene, 1-vinylnaphthalene, 2-vinylpyridine and 4-vinylpyridine.

In particular, the initiation system according to the invention makes it possible to prepare polymethyl methacrylates (PMMA) which have a number-average molecular mass (Mn) of between 2000 and 1,000,000 and a polydispersity value Mw/Mn of between 1.03 and 1.5. The PMMAs have percentages of syndiotactic triads which are higher than or equal to 80% even in a nonpolar solvent, and this gives them a glass transition temperature of approximately 130° C. and therefore a higher heat resistance than that of PMMAs prepared by radical polymerisation.

With the initiation system according to the invention it is also possible to obtain vinylaromatic monomer polymers which have a number-average molecular mass (Mn) of 2000 to 1,000,000 and a polydispersity value of 1.05 to 1.50.

The polymerisation of monomers in the presence of the initiation system according to the invention makes it possible to prepare blocks with a view to forming di- or triblock copolymers as well as star-shaped copolymers, particularly living primary alkyl acrylate polymer blocks from which it is possible to prepare these polymers in an excellent yield, since no acrylate homopolymer is formed.

In particular, the initiation system according to the invention is useful for the preparation of diblock copolymers of A-B structure, in which A and B may denote a block of an acrylic monomer, for example of primary, secondary or tertiary alkyl acrylate or of a methacrylic or nonacrylic vinyl monomer, at least one of the blocks being an acrylic block; these monomers have been defined above.

These diblock copolymers may have the A-B structure as defined in Patent EP-A-402,219, in which A denotes a block of secondary or tertiary alkyl acrylate monomer, of methacrylate monomer or of vinylaromatic monomer and B denotes a primary alkyl acrylate block. These copolymers, obtained in the presence of the initiation system according to the invention, have a narrower polydispersity (1.06 to 1.45 instead of 1.2 to 2.2) than that obtained with the system of Patent EP-A-402,219.

As it is now possible to obtain a living polymer block from a primary alkyl acrylate monomer by employing the initiation system according to the invention, it is possible, in particular, to obtain diblock copolymers of A-B structure in which A denotes not only a block of a methacrylic monomer, secondary or tertiary alkyl methacrylate or nonacrylic vinyl monomer, but also a primary alkyl acrylate monomer block and B denotes a block of a methacrylic monomer or of primary, secondary or tertiary alkyl acrylate, the number-average molecular mass of the copolymer being between 5000 and 500,000 and the polydispersity value lower than or equal to 1.2.

The initiation system according to the invention is also useful for the preparation of triblock copolymers comprising at least one acrylic block, for example, as described in Patent EP-A-408,429 and capable of having properties which allow them to be employed especially in the manufacture of elastomeric articles.

According to this patent, (1) an anionic polymerisation of at least one monomer A is conducted with the aid of an initiation system, to obtain a living chain unit A⁻, then (2) the said living chain unit is reacted with at least one monomer B to obtain a living diblock copolymer (A-B)⁻, then (3) the said copolymer (A-B)⁻ is reacted with at least one monomer C to form a living triblock copolymer (A-B-C)⁻, and, finally, (4) the copolymer (A-B-C)⁻ is reacted with at least one protolytic compound.

According to this Patent EP-A-408,429, it is also possible to obtain copolymers of formula A-B-A. To do this, (1) the anionic polymerisation of at least one monomer B is performed with the aid of an initiation system consisting of at least one difunctional initiator such as naphthalenelithium, naphthalenesodium, 1,4-dilithio-1,1,4,4-tetraphenylbutane and at least one ligand chosen from alkali or alkaline-earth metal salts, to obtain a living polymer ⁻B⁻, then (2) the said polymer ⁻(B)⁻ is reacted with at least one monomer A to form a living triblock copolymer ⁻(A-B-A)⁻, and, finally, (3) the copolymer ⁻(A-B-A)⁻ is reacted with at least one protolytic compound.

Using the processes described in this Patent EP-A-408, 429 triblock copolymers are obtained, which have a number-average molecular weight ranging approximately from 3000 to 300,000 and a molecular weight polydispersity ranging approximately from 1.05 to 2.0, of A-B-C structure, in which each of the blocks A, B and C may denote a monomer sequence chosen from acrylic, vinylaromatic and methacrylic monomers, on condition that at least one of the blocks A and C is chosen from a class other than that of block B.

By employing the system according to the present invention as initiating system it is possible to obtain triblock copolymers of A-B-C type, in which blocks A, B and C denote acrylic, methacrylic or nonacrylic vinyl monomer blocks as defined above, which have a number-average molecular mass Mn of 3000 to 500,000 and a molecular mass polydispersity Mw/Mn of between 1.05 and 2.0, particularly starting from primary alkyl acrylate blocks.

The initiation system according to the invention makes it possible in particular to obtain triblock copolymers of formula A-B-A in which blocks A and B may be acrylic, nonacrylic vinyl or methacrylic blocks and thus form, for example, the following categories:

acrylic-b-methacrylic-b-acrylic
methacrylic-b-acrylic-b-methacrylic
(meth)acrylic-b-vinyl-(meth)acrylic.

These copolymers may have a number-average molecular mass Mn of 3000 to 500,000 and a polydispersity of 1.05 to 1.30, a polydispersity which is narrower than that obtained by the process described in EP-A-408,429.

In particular, the triblock copolymers of the A-B-C or A-B-A type can be prepared, when the initiation system according to the invention is employed, directly from primary alkyl acrylate polymer blocks, as indicated above.

The initiation system according to the invention is also useful for preparing star-shaped block copolymers based on nonacrylic vinyl and/or methacrylic blocks and acrylic blocks.

It is possible to prepare, according to the invention, star-shaped copolymers of the type of those described in EP-A-408,420 and which may have the formula:

in which,
either:
  PA denotes a polymer block originating from at least one monomer A chosen from nonacrylic vinyl and methacrylic monomers;
  PB denotes a polymer block originating from at least one acrylic monomer B; and
  PC is optionally present, in which case it denotes a polymer block originating from at least one monomer C chosen from methacrylic monomers; or:
  PA and PC each denote a polymer block originating from the same acrylic monomer; and
  PB denotes a polymer block originating from at least one monomer B chosen from methacrylic monomers;
  PD denotes a polymer block originating from at least one monomer D chosen from nonacrylic vinyl and methacrylic monomers, and simultaneously PE denotes a polymer block originating from at least one acrylic monomer E; or else PD denotes a polymer block originating from at least one acrylic monomer D, and simultaneously PE denotes a polymer block originating from at least one methacrylic monomer E;
  n denotes the number of branches of (PA-PB-PC) and is between 2 and 50 inclusive, and m denotes the number of branches of (PD-PE) and is between 0 and 18 inclusive, on condition that the sum n+m does not exceed the value of 50;

it being possible for each of the branches (PA-PB-PC) and (PD-PE) furthermore to comprise only a single polymer block, in which case the two blocks are different, one being of an acrylic monomer and the other of a monomer chosen from nonacrylic vinyl and methacrylic monomers; and X denotes a crosslinked nodule of at least one polymerised monomer Mr, the said monomer Mr consisting of a multifunctional crosslinking agent containing at least two polymerisable double bonds per molecule, such as polyol polymethacrylates and polyacrylates, such as alkylene glycol dimethacrylates and alkylene glycol diacrylates.

To prepare such star-shaped copolymers, (1) the anionic polymerisation of at least one monomer A is conducted with the aid of the initiation system comprising a monofunctional initiator and at least one ligand such as alkali metal salts, to obtain a living chain unit of the polymer block PA⁻; then (2) the said living chain unit thus obtained is reacted with at least one monomer B in the presence of at least one ligand as defined above, and this makes it possible to obtain a living diblock copolymer (PA-PB)⁻, then (3) the said living diblock copolymer thus obtained is reacted with at least one monomer C in the presence of at least one ligand as defined above, and this makes it possible to obtain the living triblock copolymer (PA-PB-PC)⁻; it being possible for stage (3) to be omitted and for the process to be started by conducting stage (1) with the monomer B, or else it is possible to form only one living block PA⁻ or PB⁻ or PC⁻;

(4) if appropriate, a living diblock copolymer (PD-PE)⁻ is formed by proceeding as in (1) and (2), but starting with at least one monomer D and at least one monomer E; or else a living block PD⁻ or PE⁻ is formed by conducting stage (1) with the monomers D or E;

(5) the living copolymer (PA-PB-PC)⁻ or (PA-PB)⁻ or (PB-PC)⁻ copolymer or the living block PA⁻ or PB⁻ or PC⁻, mixed, if appropriate, with the living diblock copolymer (PD-PE)⁻ or the living block PD⁻ or PE⁻ obtained according to (4), in the medium which was used to conduct their polymerisation by an anionic route, with at least one monomer Mr in a molar excess of 4 to 26 per active centre, and the double bonds are deactivated by a reaction with a proton source consisting especially of an alcohol, of water or a protonic acid, and (6) if appropriate, a transesterification of the star-shaped copolymer obtained is conducted in an acidic medium.

The star-shaped block copolymers described in Patent EP-A-408,420 may exhibit a number-average molecular mass of approximately 1000 to 500,000 in the case of each of the blocks. Their polydispersity value is generally between 1.1 and 2.

The polymer blocks originating from nonacrylic vinyl monomers and from poly(methylmethacrylate) of the star-shaped copolymers are rigid blocks; the blocks of poly(alkyl other than methyl methacrylate) may be semiflexible or rigid blocks and the poly(alkyl acrylate) blocks are flexible blocks imparting stability on aging. Depending on the content of rigid, flexible and semiflexible blocks, there are obtained, in the case of star-shape polymers, thermoplastic elastomers (which have a composition of the order of 60–90% by weight of acrylic flexible blocks) which can be applied especially to the manufacture of injection-moulded articles, high-impact rigid thermoplastic polymers (which have a composition of the order of 10–50% by weight of flexible blocks) and high-impact reinforcing polymers of various thermoplastic matrices (in the case of a composition of the order of 40–80% by weight of flexible blocks).

The initiation system according to the invention makes it possible, in particular, to prepare star-shaped copolymers of form $$(PA-PB)_n X$$

in which PA and PB denote acrylic blocks, particularly primary alkyl acrylate, methacrylic or nonacrylic vinyl ones, at least one of the blocks being an acrylic block.

The star-shaped block copolymers obtained according to the invention can exhibit a number-average molecular mass of between 1000 and 500,000 in the case of each block thereof. Their polydispersity value is generally between 1.1 and 2.0.

They are particularly useful as thermoplastic elastomers and rheology modifiers.

The following examples, not intended to be limiting, illustrate the invention.

Examples 1 to 13 relate to the polymerisation of primary, secondary or tertiary acrylic monomers or of vinyl monomers in the presence of the initiation system according to the invention.

Examples 14 and 15 show the living nature of the macroanions obtained from primary alkyl acrylates by employing the initiation system according to the invention. This permits the direct synthesis of diblock or triblock copolymers of A-B-A type or of star-shaped copolymers $(PA-PB)_n$—X.

Examples 16 to 21 describe the preparation of diblock copolymers.

Examples 22 to 24 describe the preparation of triblock copolymers.

Examples 25 and 26 relate to the preparation of star-shaped copolymers.

In the examples given below the alcoholates ROLi, employed in the invention, are the following ones:

$CH_3(OCH_2CH_2)OLi$
$CH_3(OCH_2CH_2)_2OLi$
$CH_3(OCH_2CH_2)_3OLi$
$n-Bu(OCH_2CH_2)_2OLi$
and $(OCH_2CH_2)_2OLi$.

The alcoholates are prepared, for example, by reaction of methoxyethoxyethanol with any base whose pKa is higher than the pKa of the pair methoxyethoxyethanolate/methoxyethoxyethanol.

Thus, lithium ethoxylates can be prepared by reaction with metallic lithium or by reaction with an organometallic lithium compound in a polar or nonpolar solvent.

Example a 250 ml of THF distilled over sodium and 3.5 g (0.5 mol, 2 eq.) of metallic lithium, cleaned beforehand, are introduced into a 500-ml two-necked round bottom flask fitted with a condenser and predried under argon atmosphere. 30 ml (0.25 mol) of methoxyethoxyethanol predried over $CaH_2$ are then introduced in small portions. The mixture is refluxed for 12 hours, after which the solution is transferred to a single-necked round bottom flask with the aid of a capillary needle. This solution, approximately 1M, is stored in the dark at 0° C.

Example b 250 ml of THF distilled over sodium and 0.25 mol of methoxyethoxyethanol predried over $CaH_2$ are introduced into a 500-ml round bottom flask predried under argon atmosphere. 0.25 mol of BuLi in solution in n-hexane are then introduced in small portions at room temperature. After 5 min the yellowish solution can be stored or employed as such for polymerisation.

In all the examples the number-average molecular mass and the polydispersity value were determined by exclusion chromatography performed by employing an HP 1050 apparatus equipped with two linear columns of porosities of 100, $10^3$, $10^4$ and $10^5$ Å respectively, with tetrahydrofuran as eluent at a flow rate of 1 ml/min.

EXAMPLE 1

$10.0 \times 10^{-3}$ mol of $CH_3OCH_2CH_2OLi$ in solution in THF are introduced under nitrogen atmosphere into a predried round bottom flask. 90 ml of toluene are added followed, with stirring, dropwise, by $1.0 \times 10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.048 mol of 2-ethylhexyl acrylate previously stirred for 48 hours over calcium hydride, distilled and treated over fluorenyllithium until the appearance of a yellow colour and distilled over triethylaluminium immediately before the polymerisation. After 10 minutes the reaction is stopped by addition of 5 ml of acidified methanol and the solvent is then stripped off. A 2-ethylhexyl acrylate polymer is obtained in a 90% yield. Analysis of the polymer by GPC shows the following characteristics:

$\overline{M}n=23,000$
$\overline{M}w/\overline{M}n=2.3$

EXAMPLE 2

$2.0 \times 10^{-3}$ mol of $CH_3OCH_2CH_2OLi$ in solution in THF are introduced under nitrogen atmosphere into a predried round bottom flask. 100 ml of predried THF are added followed, with stirring, dropwise, by $1.0 \times 10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.048 mol of 2-ethylhexyl acrylate previously stirred for 48 hours over calcium hydride, distilled and then treated over fluorenyllithium until the appearance of a yellow colour and distilled over triethylaluminium immediately before the polymerisation. After 10 minutes the reaction is stopped by addition of 5 ml of acidified methanol and the solvent is then stripped off. An ethylhexyl acrylate polymer is obtained in a 95% yield. Analysis of the polymer by GPC shows the following characteristics:

$\overline{M}n=29,000$
$\overline{M}w/\overline{M}n=3.3$

EXAMPLE 3

$1.0 \times 10^{-3}$ mol of $CH_3OCH_2CH_2OLi$ in solution in THF are introduced under nitrogen atmosphere into a predried round bottom flask. 90 ml of toluene are added followed, with stirring, dropwise, by $1.0 \times 10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.070 mol of n-butyl acrylate previously stirred for 48 hours over calcium hydride, distilled and then treated over fluorenyllithium until the appearance of a yellow colour and distilled over triethylaluminium immediately before the polymerisation. After 30 minutes the reaction is stopped by addition of 5 ml of acidified methanol and the solvent is then stripped off. An n-butyl acrylate polymer is obtained in an 80% yield. Analysis of the polymer by GPC shows the following characteristics:

$\overline{M}n=22,000$
$\overline{M}w/\overline{M}n=3.3$

EXAMPLE 4

$2.0 \times 10^{-3}$ mol of $CH_3(OCH_2CH_2)_2OLi$ in solution in THF are introduced under nitrogen atmosphere into a predried round bottom flask. 90 ml of toluene and 5 ml of predried THF are added followed, with stirring, dropwise, by $0.2 \times 10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.048 mol of 2-ethylhexyl acrylate previously stirred for 48 hours over calcium hydride, distilled and then treated over fluorenyllithium until the appearance of a yellow colour and distilled over triethylaluminium immediately before the polymerisation. After 1 minute the reaction is stopped by addition of 5 ml of acidified methanol and the solvent is then stripped off. A 2-ethylhexyl acrylate polymer is obtained in 100% yield. Analysis of the polymer by GPC shows the following characteristics:

$\overline{M}n=36,600$
$\overline{M}w/\overline{M}n=1.08$

EXAMPLE 5

$2.0 \times 10^{-3}$ mol of $CH_3(OCH_2CH_2)_2OLi$ in solution in THF are introduced under nitrogen atmosphere into a predried round bottom flask. 90 ml of toluene and 8 ml of predried THF are added followed, with stirring, dropwise, by $1.0 \times 10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.048 mol of 2-ethylhexyl acrylate previously stirred for 48 hours over calcium hydride, distilled and then treated over fluorenyllithium until the appearance of a yellow colour and distilled over triethylaluminium immediately before the polymerisation. After 10 minutes the reaction is stopped by addition of 5 ml of acidified methanol and the solvent is then stripped off. A 2-ethylhexyl acrylate polymer is obtained in a 90% yield. Analysis of the polymer by GPC shows the following characteristics:

$\overline{M}n=27,000$
$\overline{M}w/\overline{M}n=1.7$

EXAMPLE 6

$2.0 \times 10^{-3}$ mol of $CH_3(OCH_2CH_2)_2OLi$ in solution in THF are introduced under nitrogen atmosphere into a predried round bottom flask. 100 ml of predried THF are added followed, with stirring, dropwise, by $1.0 \times 10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.048 mol of 2-ethylhexyl acrylate previously stirred for 48 hours over calcium hydride, distilled and then treated over fluorenyllithium until the appearance of a yellow colour and distilled over triethylaluminium immediately before the polymerisation. After 10 minutes the reaction is stopped by addition of 5 ml of acidified methanol and the solvent is then stripped off. A 2-ethylhexyl acrylate polymer is obtained in an 80% yield. Analysis of the polymer by GPC shows the following characteristics:

$\overline{M}n=47,500$ $\overline{M}w/\overline{M}n=1.7$

EXAMPLE 7

$10.0\times10^{-3}$ mol of $CH_3(OCH_2CH_2)_2OLi$ in solution in THF are introduced under nitrogen atmosphere into a predried round bottom flask. 100 ml of toluene are added followed, with stirring, dropwise, by $1.0\times10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.024 mol of 2-ethylhexyl acrylate previously stirred for 48 hours over calcium hydride, distilled and then treated over fluorenyllithium until the appearance of a yellow colour and distilled over triethylaluminium immediately before the polymerisation. After 30 minutes the reaction is stopped by addition of 5 ml of acidified methanol and the solvent is then stripped off. A 2-ethylhexyl acrylate polymer is obtained in 100% yield. Analysis of the polymer by GPC shows the following characteristics:

$\overline{M}n=7,500$ $\overline{M}w/\overline{M}n=1.38$

EXAMPLE 8

$5.0\times10^{-3}$ mol of $CH_3(OCH_2CH_2)_2OLi$ in solution in THF are introduced under nitrogen atmosphere into a predried round bottom flask. 90 ml of toluene and 5 ml of predried THF are added followed, with stirring, dropwise, by $0.5\times10^{-3}$ mol of $(Ph)_2CHLi$ in 0.2-molar solution in THF. The mixture is cooled to a temperature of $-30°$ C. with a mixture of acetone and solid carbon dioxide, followed by the addition, still at $-30°$ C., of 0.048 mol of 2-ethylhexyl acrylate previously stirred for 48 hours over calcium hydride, distilled and then treated over fluorenyllithium until the appearance of a yellow colour and distilled over triethylaluminium immediately before the polymerisation. After 15 minutes the reaction is stopped by addition of 5 ml of acidified methanol and the solvent is then stripped off. A 2-ethylhexyl acrylate polymer is obtained in an 85% yield. Analysis of the polymer by GPC shows the following characteristics:

$\overline{M}n=22,000$ $\overline{M}w/\overline{M}n=2.5$

EXAMPLE 9

$5.0\times10^{-3}$ mol of $CH_3(OCH_2CH_2)_2OLi$ in solution in THF are introduced under nitrogen atmosphere into a predried round bottom flask. 90 ml of toluene and 5 ml of predried THF are added followed, with stirring, dropwise, by $0.5\times10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.047 mol of methyl methacrylate (MMA) previously stirred for 48 hours over calcium hydride and distilled over triethylaluminium immediately before the polymerisation. After 15 minutes the reaction is stopped by addition of 5 ml of acidified methanol and the solvent is then stripped off. A polymethyl methacrylate (PMMA) is obtained in a 100% yield. Analysis of the polymer by GPC shows the following characteristics:

$\overline{M}n=7,100$ $\overline{M}w/\overline{M}n=1.04$

Its microstructure can be described as follows:

syndiotactic triads: 80% heterotactic triads: 18.5% isotactic triads: 0.5%.

The glass transition temperature is 130° C.

EXAMPLE 10

$5.0\times10^{-3}$ mol of $CH_3(OCH_2CH_2)_2OLi$ in solution in THF are introduced under nitrogen atmosphere into a predried round bottom flask. 90 ml of predried toluene and 5 ml of predried THF are added followed, with stirring, dropwise, by $0.5\times10^{-3}$ mol of $(Ph)_2CHLi$ in 0.2-molar solution in THF. The mixture is cooled to a temperature of $-78°$ C. with a mixture of acetone and solid carbon dioxide, followed by the addition, still at $-78°$ C., of 0.04 mol of n-butyl acrylate (n-BuA) previously stirred for 48 hours over calcium hydride, distilled after addition of a small quantity of triethylaluminium immediately before the polymerisation. After 1 minute the reaction is stopped by addition of 5 ml of acidified methanol and the solvent is then stripped off. The polymer is precipitated in methanol. An n-butyl acrylate polymer is obtained in 100% yield. Analysis of the polymer by GPC shows the following characteristics:

$\overline{M}n=15,500$ $\overline{M}w/\overline{M}n=1.09$

EXAMPLE 11

$10^{-2}$ mol of $n-Bu(OCH_2CH_2)_2OLi$ in solution in THF are introduced under nitrogen atmosphere into a predried round bottom flask. 125 ml of predried toluene are added followed, with stirring, dropwise, by $10^{-3}$ mol of $Ph_2CHLi$ in 0.2-molar solution in THF. The mixture is cooled to a temperature of $-78°$ C. with a mixture of acetone and solid carbon dioxide, followed by the addition, still at $-78°$C., of 0.048 mol of 2-ethylhexyl acrylate previously stirred for 48 hours over calcium hydride, distilled after addition of a small quantity of triethylaluminium immediately before the polymerisation. After 30 minutes the reaction is stopped by addition of 5 ml of acidified methanol and the solvent is then stripped off. The polymer is precipitated in methanol. A 2-ethylhexyl acrylate polymer is obtained in an 82% yield. Analysis of the polymer by GPC shows the following characteristics:

$\overline{M}n=20,000$ $\overline{M}w/\overline{M}n=2.8$

EXAMPLE 12

$2.0\times10^{-3}$ mol of $CH_3(OCH_2CH_2)_2OLi$ in solution in THF are introduced under nitrogen atmosphere into a predried round bottom flask. 100 ml of predried toluene are added followed, with stirring, dropwise, by $0.2\times10^{-3}$ mol of $Ph_2CHLi$ in 0.2-molar solution in THF. The mixture is cooled to a temperature of $-78°$ C. with a mixture of acetone and solid carbon dioxide, followed by the addition, still at $-78°$ C., of $0.5\times10^{-3}$ mol of t-butyl acrylate (t-BuA) previously stirred for 48 hours over calcium hydride, distilled after addition of a small quantity of triethylaluminium immediately before the polymerisation. After 10 minutes the reaction is stopped by addition of 2 ml of acidified methanol, and the product is then precipitated in an excess of methanol. After drying under vacuum at 80° C., a t-butyl acrylate polymer is obtained in 100% yield. Analysis of the polymer by GPC shows the following characteristics:

$\overline{M}n=16,000$ $\overline{M}w/\overline{M}n=1.16$

EXAMPLE 13

$10^{-2}$ mol of $n-Bu(OCH_2CH_2)_2OLi$ in solution in THF are introduced under nitrogen atmosphere into a predried round bottom flask. 100 ml of predried toluene are added together with 1 ml of α-methylstyrene previously distilled over calcium hydride and then over fluorenyllithium. $10^{-3}$ mol of s-BuLi in solution in heptane are added dropwise and with stirring. The mixture is cooled to a temperature of −78° C. with a mixture of acetone and solid carbon dioxide, followed by the addition, still at −78° C., of 0.043 mol of styrene previously stirred for 24 hours over calcium hydride, distilled and then treated over fluorenyllithium until the appearance of a yellow colour and redistilled immediately before the polymerisation.

After 30 minutes the reaction is stopped by addition of 5 ml of acidified methanol and the polymer is then precipitated in methanol. A styrene polymer is obtained in 100% yield. Analysis of the polymer by GPC shows the following characteristics:

$\overline{M}n=27,000$ $\overline{M}w/\overline{M}n=1.08$

Demonstration of the living nature by addition of a second dose of monomer: Examples 14 and 15

EXAMPLE 14

$10.0\times10^{-3}$ mol of $CH_3(OCH_2CH_2)_2OLi$ in solution in THF are introduced under nitrogen atmosphere into a predried round bottom flask. 200 ml of predried toluene and 10 ml of predried THF are added followed, with stirring, dropwise, by $1.0\times10^{-3}$ mol of $(Ph)_2CHLi$ in 0.2-molar solution in THF. The mixture is cooled to a temperature of −78° C. with a mixture of acetone and solid carbon dioxide, followed by the addition, still at −78° C., of 0.024 mol of 2-ethylhexyl acrylate (2-EtHA) previously stirred for 24 hours over calcium hydride, distilled and then treated over fluorenyllithium until the appearance of a yellow colour and redistilled over triethylaluminium immediately before the polymerisation. After 10 minutes' polymerisation a sample is taken, which shows the characteristics of the prepolymer:

$\overline{M}n=4,000$ $\overline{M}w/\overline{M}n=1.07$

A second dose of 2-ethylhexyl acrylate (0.047 mol) is added. After 25 minutes the reaction is stopped by addition of 5 ml of acidified methanol. A 2-ethylhexyl acrylate polymer is obtained in 100% yield. Analysis of the polymer by GPC shows the following characteristics:

$\overline{M}n=30,000$ $\overline{M}w/\overline{M}n=1.12$ (Exclusion chromatography shows 13.5% deactivation of the macroanions P(2-EtHA).

EXAMPLE 15

$10.0\times10^{-3}$ mol of $CH_3(OCH_2CH_2)_2OLi$ in solution in THF are introduced under nitrogen atmosphere into a predried round bottom flask. 200 ml of predried toluene and 10 ml of predried THF are added followed, with stirring, dropwise, by $1.0\times10^{-3}$ mol of $(Ph)_2CHLi$ in 0.2-molar solution in THF. The mixture is cooled to a temperature of −100° C. with a mixture of THF and liquid nitrogen, followed by the addition, still at −100° C., of 0.024 mol of 2-ethylhexyl acrylate (2-EtHA) previously stirred for 48 hours over calcium hydride, distilled and then treated over fluorenyllithium until the appearance of a yellow colour and distilled over triethylaluminium immediately before the polymerisation. After 10 minutes' reaction a sample is taken, which shows the characteristics of the prepolymer:

$\overline{M}n=4,200$ $\overline{M}w/\overline{M}n=1.16$

A second dose of 2-ethylhexyl acrylate (0.047 mol) is added and after 1 hour the reaction is stopped by addition of 5 ml of acidified methanol. A 2-ethylhexyl acrylate polymer is obtained in 100% yield. Analysis of the polymer by GPC shows the following characteristics:

$\overline{M}n=16,800$ $\overline{M}w/\overline{M}n=1.16$

In these examples of-preparation of macroanions of 2-ethylhexyl acrylate polymer it can be seen that, at −78° C., a polymer which has a molecular mass Mn of 30,000 is obtained and the percentage deactivation of the macroanion is 13.5%. When the polymerisation takes place at −100° C. the polymer obtained has a molecular mass Mn of 16,800 and the percentage deactivation of the macroanion is only 7%.

EXAMPLE 16

Diblock copolymer P(2-EtHA-b-MMA)

$10^{-2}$ mole of $CH_3(OCH_2CH_2)_2OLi$ in solution in THF are introduced under nitrogen atmosphere into a predried round bottom flask. 150 ml of predried toluene are added followed, with stirring, dropwise, by $10^{-3}$ mol of $(Ph)_2CHLi$ in 0.2-molar solution in THF. The mixture is cooled to a temperature of −78° C. with a mixture of acetone and solid carbon dioxide, followed by the addition, still at −78°C., of 0.024 mol of 2-ethylhexyl acrylate (2-EtHA) previously stirred for 48 hours over calcium hydride, distilled and then treated over fluorenyllithium until the appearance of a yellow colour and distilled after the addition of a small quantity of triethylaluminium immediately before the polymerisation.

After 2 minutes' reaction a sample is taken, which shows the characteristics of the first block:

$\overline{M}n=4,800$ $\overline{M}w/\overline{M}n=1.05$ 0.11 mol of methyl methacrylate (MMA) previously stirred for 48 hours over calcium hydride and distilled after addition of a small quantity of triethylaluminium immediately before the reaction are then added to the reactor.

After 10 minutes the reaction is stopped by addition of 2 ml of acidified methanol and the product is then precipitated in an excess of methanol. After drying under vacuum at 80° C. a diblock copolymer is obtained in 100% yield, the analysis of which by exclusion chromatography shows the following characteristics:

$\overline{M}n=16,000$ $\overline{M}w/\overline{M}n=1.06$

EXAMPLE 17

Diblock copolymer P(MMA-b-2-EtHA)

$10^{-2}$ mol of $CH_3(OCH_2CH_2)_2OLi$ in solution in THF are introduced under nitrogen atmosphere into a predried round bottom flask. 100 ml of predried toluene are added followed, with stirring, dropwise, by $10^{-3}$ mol of $(Ph)_2CHLi$ in 0.2-molar solution in THF. The mixture is cooled to a temperature of −78° C. with a mixture of acetone and solid carbon dioxide, followed by the addition, still at −78° C., of 0.046 mol of methyl methacrylate (MMA) previously stirred for 48 hours over calcium hydride and distilled after the addition of a small quantity of triethylaluminium immediately before the polymerisation.

After 10 minutes' reaction a sample is taken, which shows the characteristics of the first block:

$\overline{M}n=7,185$ $\overline{M}w/\overline{M}n=1.06$ 0.1 mol of 2-ethylhexyl acrylate (2-EtHA) previously stirred for 48 hours over calcium hydride, distilled and then treated over fluorenyllithium until the appearance of a yellow colour, and redistilled after addition of a small quantity of triethylaluminium immediately before the reaction are then added to the reactor.

After 30 minutes the reaction is stopped by addition of 2 ml of acidified methanol and the product is then precipitated in an excess of methanol. After drying under vacuum at 80° C. a diblock copolymer is obtained in 100% yield, the analysis of which by exclusion chromatography shows the following characteristics:

$\overline{M}n=21,000$ $\overline{M}w/\overline{M}n=1.06$

It was noted that, in this example, the polymerisation is well controlled and no residual methyl methacrylate homopolymer is observed.

EXAMPLE 18

Diblock copolymer P(St-b-2-EtHA)

$10^{-2}$ mol of $CH_3(OCH_2CH_2)_2OLi$ in solution in THF are introduced under nitrogen atmosphere into a predried round bottom flask. 150 ml of predried toluene are added together with 1 ml of α-methylstyrene previously distilled over calcium hydride and then over fluorenyllithium.

4.5 ml ($10^{-3}$ mol) of s-BuLi in solution in heptane are added dropwise and with stirring. The mixture is cooled to a temperature of −78° C. with a mixture of acetone and solid carbon dioxide, followed by the addition, still at −78° C. of 5 ml (0.043 mol) of styrene previously stirred for 24 hours over calcium hydride, distilled and then treated over fluorenyllithium until the appearance of a yellow colour and redistilled immediately before the polymerisation.

After 30 minutes' reaction a sample is taken, which shows the characteristics of the polystyrene block:

$\overline{M}n=5,000$ $\overline{M}w/\overline{M}n=1.12$ 0.048 mol of 2-ethylhexyl acrylate (2-EtHA) previously stirred for 48 hours over calcium hydride, distilled and then treated over fluorenyllithium until the appearance of a yellow colour, and redistilled after addition of a small quantity of triethylaluminium immediately before the reaction are then added to the reactor.

After 60 minutes the reaction is stopped by addition of 2 ml of acidified methanol and the product is then precipitated in an excess of methanol. After drying under vacuum at 80° C. a diblock copolymer is obtained in 100% yield, the analysis of which by exclusion chromatography shows the following characteristics:

$\overline{M}n=15,000$ $\overline{M}w/\overline{M}n=1.22$

EXAMPLE 19

Diblock copolymer P(St-b-2-EtHA)

$10^{-2}$ mole of $Et(OCH_2CH_2)_2OLi$ in solution in THF are introduced under nitrogen atmosphere into a predried round bottom flask. 150 ml of predried toluene are added together with 1 ml of α-methylstyrene previously distilled over calcium hydride and then over fluorenyllithium. 3.2 ml ($10^{-3}$ mol) of s-BuLi in solution in heptane are added dropwise and with stirring. The mixture is cooled to a temperature of −78° C. with a mixture of acetone and solid carbon dioxide, followed by the addition, still at −78° C., of 5 ml (0.043 mol) of styrene previously stirred for 24 hours over calcium hydride, distilled and then treated over fluorenyllithium until the appearance of a yellow colour and redistilled immediately before the polymerisation.

After 30 minutes' reaction a sample is taken, which shows the characteristics of the polystyrene block:

$\overline{M}n=21,000$ $\overline{M}w/\overline{M}n=1.07$ 0.048 mol of 2-ethylhexyl acrylate (2-EtHA) previously stirred for 48 hours over calcium hydride, distilled and then treated over fluorenyllithium until the appearance of a yellow colour, and redistilled after addition of a small quantity of triethylaluminium immediately before the reaction are then added to the reactor.

After 60 minutes the reaction is stopped by addition of 2 ml of acidified methanol and the product is then precipitated in an excess of methanol. After drying under vacuum at 80° C. a diblock copolymer is obtained in 100% yield, the analysis of which by exclusion chromatography shows the following characteristics:

$\overline{M}n=33,600$ $\overline{M}w/\overline{M}n=1.40$

EXAMPLE 20

Diblock copolymer P(St-b-2-n-BuA $10^{-2}$ mol of $CH_3(OCH_2CH_2)_2OLi$ in solution in THF are introduced under nitrogen atmosphere into a predried round bottom flask. 150 ml of predried toluene are added together with 1 ml of α-methylstyrene previously distilled over calcium hydride and then over fluorenyllithium. 3.2 ml ($10^{-3}$ mol) of s-BuLi in solution in heptane are added dropwise and with stirring. The mixture is cooled to a temperature of −78° C. with a mixture of acetone and solid carbon dioxide, followed by the addition, still at −78° C., of 5 ml (0.043 mol) of styrene previously stirred for 24 hours over calcium hydride, distilled and then treated over fluorenyllithium until the appearance of a yellow colour and redistilled immediately before the polymerisation.

After 25 minutes' reaction a sample is taken, which shows the characteristics of the polystyrene block:

$\overline{M}n=18,300$ $\overline{M}w/\overline{M}n=1.14$ 10 ml (0.069 mol) of n-butyl acrylate previously stirred for 48 hours over calcium hydride, distilled and then treated over fluorenyllithium until the appearance of a yellow colour and distilled and redistilled after addition of a small quantity of triethylaluminium immediately before the reaction are then added to the reactor.

After 60 minutes the reaction is stopped by addition of 2 ml of acidified methanol and the product is then precipitated in an excess of methanol. After drying under vacuum at 80° C. a diblock copolymer is obtained in 100% yield, the analysis of which by exclusion chromatography shows the following characteristics:

$\overline{M}n=38,000$ $\overline{M}w/\overline{M}n=1.45$

EXAMPLE 21

Diblock copolymer P(MMA-b-n-BuA $10^{-2}$ mol of $CH_3(OCH_2CH_2)_2OLi$ in solution in THF are introduced under nitrogen atmosphere into a predried round bottom flask. 200 ml of toluene are added followed, with stirring, dropwise, by 5 ml ($10^{-3}$ mol) of $Ph_2CHLi$ in 0.2M solution in THF. The mixture is cooled to a temperature of −78° C. with a mixture of acetone and solid carbon dioxide, followed by the addition, still at −78° C., of 5 ml (0.047 mol) of methyl methacrylate (MMA) previously stirred for 48 hours over calcium hydride, distilled and redistilled after addition of a small quantity of triethylaluminium immediately before the polymerisation.

After 10 minutes' reaction a sample is taken, which shows the characteristics of the polystyrene block:

$\overline{M}n=5,200$ $\overline{M}w/\overline{M}n=1.03$ 10 ml (0.069 mol) of n-butyl acrylate previously stirred for 48 hours over calcium hydride, distilled and then treated over fluorenyllithium until the appearance of a yellow colour and distilled and redistilled after addition of a small quantity of triethylaluminium immediately before the reaction are then added to the reactor.

After 60 minutes the reaction is stopped by addition of 2 ml of acidified methanol and the product is then precipitated in an excess of methanol. After drying under vacuum at 80° C. a diblock copolymer is obtained in 100% yield, the analysis of which by exclusion chromatography shows the following characteristics:

$\overline{M}n=20,600$ $\overline{M}w/\overline{M}n=1.31$

According to Examples 16 to 21 it may be concluded that diblock copolymers of low poly-dispersity, ranging from 1.04 to 1.45, are obtained with the initiation system according to the invention. These copolymers are obtained in high yields, higher than 80%. It may also be noted that copolymers containing primary alkyl acrylate-methacrylate blocks were prepared (Example 16), copolymers which could not be obtained with an initiation system as described in Patent EP-A-402,219.

Furthermore, it has been possible to note that, in Examples 17 and 21, which relate to the preparation of diblock copolymer P(MMA-b-2-EtHa) and P(MMA-b-n-BuA), the polymerisation was well controlled and that no residual methyl methacrylate homopolymer was observed. This is important because, with initiation systems as described in Patent EP-A-402,219, 20% of methyl methacrylate homopolymer is generally obtained.

EXAMPLE 22

Triblock copolymer P-2-EtHA-b-PMMA-b-P-2-EtHA $10^{-2}$ mol of $CH_3(OCH_2CH_2)_2OLi$ in solution in THF are introduced under nitrogen atmosphere into a predried round bottom flask. 200 ml of predried toluene are added together with 1 ml of α-methylstyrene previously distilled over calcium hydride and then treated over fluorenyllithium. 5 ml ($10^{-3}$ mol) of naphthalenelithium in 0.2M solution in THF are added dropwise and with stirring. The mixture is cooled to a temperature of −78° C. with a mixture of acetone and solid carbon dioxide, followed by the addition, still at −78° C. of 2.5 ml (0.023 mol) of MMA previously stirred for 24 hours over calcium hydride and redistilled after addition of a small quantity of triethylaluminium immediately before the polymerisation.

After 15 minutes' reaction a sample is taken, which shows the characteristics of the PMMA block:

$\overline{M}n=4,000$ $\overline{M}w/\overline{M}n=1.08$ 0.048 mol of 2-ethylhexyl acrylate previously stirred for 48 hours over calcium hydride, distilled and then treated over fluorenyllithium until the appearance of a yellow colour and redistilled and redistilled after addition of a small quantity of triethylaluminium immediately before the reaction are then added to the reactor.

After 30 minutes' rection the reaction is stopped by addition of 2 ml of acidified methanol and the product is then precipitated in an excess of methanol. After drying under vacuum at 80° C. a triblock copolymer is obtained in 100% yield, the analysis of which by exclusion chromatography shows the following characteristics:

$\overline{M}n=18,500$ $\overline{M}w/\overline{M}n=1.15$

A copolymer of low polydispersity and without any methyl methacrylate homopolymer is obtained.

EXAMPLE 23

Triblock copolymer PMMA-P-2-EtHA-PMMA $10^{-2}$ mol of $CH_3(OCH_2CH_2)_2OLi$ in solution in THF are introduced under nitrogen atmosphere into a predried round bottom flask. 200 ml of predried toluene are added together with 0.5 ml of diphenylethylene previously distilled in the presence of s-BuLi. 5 ml ($10^{-3}$ mol) of naphthalenelithium in 0.2M solution in THF are added dropwise and with stirring. The mixture is cooled to a temperature of −100° C. with a mixture of THF and liquid nitrogen, followed by the addition, still at −100° C., of 5 ml (0.023 mol) of 2-ethylhexyl acrylate (2-EtHA) previously stirred for 24 hours over calcium hydride, distilled and then treated over fluorenyllithium until the appearance of a yellow colour and redistilled after addition of a small quantity of triethylaluminium immediately before the polymerisation.

After 2 minutes' reaction a sample is taken, which shows the characteristics of the P-2-EtHA block:

$\overline{M}n=10,900$ $\overline{M}w/\overline{M}n=1.20$ 0.01 mol of methyl methacrylate previously stirred for 48 hours over calcium hydride, distilled and redistilled after addition of a small quantity of triethylaluminium immediately before the reaction are then added to the reactor.

After 30 minutes' rection the reaction is stopped by addition of 2 ml of acidified methanol and the product is then precipitated in an excess of methanol. After drying under vacuum at 80° C. A triblock copolymer is obtained in 100% yield, the analysis of which by exclusion chromatography shows the following characteristics:

$\overline{M}n=32,000$ $\overline{M}w/\overline{M}n=1.21$

In this example, a copolymer is obtained in an excellent yield and free from 2-ethylhexyl acrylate homopolymer.

EXAMPLE 24

Triblock copolymer PMMA-P-n-BuA-PMMA $10^{-2}$ mol of $CH_3(OCH_2CH_2)_2OLi$ in solution in THF are introduced under nitrogen atmosphere into a predried round bottom flask. 200 ml of predried toluene are added together with 1 ml of α-methylstyrene previously distilled over calcium hydride and then over fluorenyllithium. 5 ml ($10^{-3}$ mol) of naphthalenelithium in 0.2M solution in THF are added dropwise and with stirring. The mixture is cooled to a temperature of −78° C. with a mixture of acetone and solid carbon dioxide, followed by the addition, still at −78° C., of 5 ml (0.035 mol) of n-butyl acrylate previously stirred for 24 hours over calcium hydride, distilled and then treated over fluorenyllithium until the appearance of a yellow colour and redistilled after addition of a small quantity of triethylaluminium immediately before the polymerisation.

After 5 minutes' reaction a sample is taken, which shows the characteristics of the P-n-BdA:

$\overline{M}n=4,500$ $\overline{M}w/\overline{M}n=1.21$ 0.1 mol of methyl methacrylate (MMA) previously stirred for 48 hours over calcium hydride, distilled and redistilled after addition of a small quantity of triethylaluminium immediately before the reaction are then added to the reactor.

After 30 minutes' rection the reaction is stopped by addition of 2 ml of acidified methanol and the product is then precipitated in an excess of methanol. After drying under vacuum at 80° C. a triblock copolymer is obtained in an 80% yield, the analysis of which by exclusion chromatography shows the following characteristics:

$\overline{M}n=83,500$ $\overline{M}w/\overline{M}n=1.09$

EXAMPLE 25

Star-shaped copolymer PMMA-b-P-2-EtHA)$_n$ $10^{-2}$ mol of $CH_3(OCH_2CH_2)_2OLi$ in solution in THF are introduced under nitrogen atmosphere into a predried round bottom flask. 150 ml of toluene are added followed, with stirring, dropwise, by $10^{-3}$ mol of $Ph_2CHLi$ in 0.2M solution in THF. The mixture is cooled to a temperature of $-100°$ C. with a mixture of THF and liquid nitrogen, followed by the addition, still at $-100°$ C., of 0.047 mol of methylmethacrylate (MMA) previously stirred for 48 hours over calcium hydride, distilled and redistilled after addition of a small quantity of triethylaluminium immediately before the polymerisation.

After 10 minutes' reaction a sample is taken, which shows the characteristics of the first block:

$\overline{M}n=4,800$ $\overline{M}w/\overline{M}n=1.06$ 0.024 mol of 2-ethylhexyl acrylate (2-EtHA) previously stirred for 48 hours over calcium hydride, distilled and then treated over fluorenyllithium until the appearance of a yellow colour and redistilled after addition of a small quantity of triethylaluminium immediately before the reaction are then added to the reactor.

After 10 minutes' rection a sample is taken, which shows the characteristics of the diblock copolymer:

$\overline{M}n=10,500$ $\overline{M}w/\overline{M}n=1.11$ $10^{-2}$ mol of ethylene glycol dimethacrylate (EGDIMA) are then added and after 60 minutes the reaction is stopped by addition of 2 ml of acidified methanol and the product is then precipitated in an excess of methanol. After drying under vacuum at 80° C. a star-shaped diblock copolymer is obtained in 100% yield, the analysis of which by exclusion chromatography shows the following characteristics:

$\overline{M}n=86,000$ $\overline{M}w/\overline{M}n=1.27$

The degree of coupling is 80%.

EXAMPLE 26

Star-shaped copolymer (P-2-EtHA)$_n$X $10^{-2}$ mol of $CH_3(OCH_2CH_2)_2OLi$ in solution in THF are introduced under nitrogen atmosphere into a predried round bottom flask. 150 ml of toluene are added followed, with stirring, dropwise, by $10^{-3}$ mol of $Ph_2CHLi$ in 0.2M solution in THF. The mixture is cooled to a temperature of $-100°$ C. with a mixture of THF and liquid nitrogen, followed by the addition, still at $-100°$ C., of 0.029 mol of 2-ethylhexyl acrylate (2-EtHA) previously stirred for 48 hours over calcium hydride, distilled and then treated over fluorenyllithium until the appearance of a yellow colour and redistilled after addition of a small quantity of triethylaluminium immediately before the polymerisation.

After 10 minutes' reaction a sample is taken, which shows the characteristics of the first block:

$\overline{M}n=5,200$ $\overline{M}w/\overline{M}n=1.08$ $10^{-3}$ mol of ethylene glycol dimethacrylate (EGDIMA) are then added and after 60 minutes the reaction is stopped by addition of 2 ml of acidified methanol and the product is then precipitated in an excess of methanol. After drying under vacuum at 80° C. a star-shaped triblock copolymer is obtained in 100% yield, the analysis of which by exclusion chromatography shows the following characteristics:

$\overline{M}n=49,000$ $\overline{M}w/\overline{M}n=1.39$

The degree of coupling is 88%.

What is claimed is:

1. A process for the polymerization of acrylic or methacrylic monomers comprising polymerizing said monomers in the presence of a polymerization initiating amount of an initiation system including (1) at least one functional initiator and (2) an alkali metal alcoholate, wherein said alcoholate has the formula:

$$R'OM'$$

in which M' is an alkali metal and R' has the formula:

$$R^1(OR^2)_m$$

in which $R^1$ is a linear or branched alkyl radical containing from 1 to 6 carbon atoms or an arylalkyl radical, $R^2$ is a linear or branched alkylene radical containing from 2 to 4 carbon atoms, and m is the integer 1, 2 or 3.

2. The process according to claim 1, wherein said polymerization takes place at a temperature of between $-100°$ C. and $+60°$ C.

3. The process according to claim 1, wherein in a first stage, the anionic polymerization of a monomer A is conducted in the presence of the initiation system to obtain a living chain unit A of a polymer block A; in a second stage, the living chain unit A is reacted with a monomer B in the presence of the initiation system from the first stage such that a diblock polymer of structure A-B is formed where A and B each denote a block of acrylic monomer or of methacrylic or nonacrylic vinyl monomer, and at least A or B is an acrylic block.

4. The process according to claim 3, in which A is a primary, secondary or tertiary alkyl acrylate monomer, or an alkyl methacrylate or a vinylaromatic monomer, and B is a primary, secondary or tertiary alkyl acrylate monomer or a methacrylate monomer.

5. The process according to claim 1, wherein in a first stage, an anionic polymerization of at least one monomer A is conducted in the presence of the initiation system to obtain a living chain unit A; in a second stage, the living chain unit A is reacted with at least one monomer B to obtain a living diblock copolymer (A-B); in a third stage the copolymer (A-B) is reacted with at least one copolymer C to form a living triblock copolymer (A-B-C); and in a fourth stage, the copolymer (A-B-C) is reacted with at least one protolytic compound to form a triblock copolymer of structure A-B-C in which blocks A, B and C denote a block of acrylic, methacrylic or nonacrylic vinyl monomers, at least one of the blocks being an acrylic block, and at least one of the blocks A and C being different from block B.

6. The process according to claim 1, wherein the initiator is monofunctional and has the formula:

$$(R)_p—M$$

in which:

M is an alkali or alkaline-earth metal;

p is the valency (1 or 2) of the metal M; and

R is an alkyl radical with a straight or branched chain having 2 to 6 carbon atoms, or an aryl radical, optionally substituted, or an alkyl radical having 1 to 6 carbon atoms, substituted by at least one phenyl group.

7. The process according to claim 6, wherein the monofunctional initiator is selected from the group consisting of n-butyllithium, sec-butyllithium, alpha-methylstyryllithium, 1,1-diphenylhexyllithium, diphenylmethyllithium, diphenylmethylsodium, diphenylmethylpotassium and 1,1-diphenyl-3-methylpentyllithium.

8. The process according to claim 1, wherein the initiator is difunctional and selected from the group consisting of 1,1,4,4-tetraphenyl-1,4-dilithiobutane and 1,1,4,4-tetraphenyl-1,4-disodiobutane.

9. The process according to claim 1, wherein the molar ratio alcoholate/initiator is between 1 and 50.

10. The process according to claim 1, wherein a triblock copolymer of formula A-B-A is formed, A and B being blocks of primary, secondary or tertiary alkyl acrylate monomers or of methacrylic or nonacrylic vinyl monomers, at least one of the blocks being an acrylic block, which comprises anionic alkyl polymerizing at least one monomer B in the presence of said initiation system, in which the initiator is a difunctional initiator, to obtain a living chain unit B; then reacting the living chain unit with at least one monomer A to form a living triblock polymer (A-B-A); and then reacting the copolymer (A-B-A) with at least one protolytic compound.

11. The process according to claim 1, wherein the initiator is naphthalenelithium, naphthalenesodium or naphthalenepotassium.

12. The process according to claim 11, wherein the initiator is naphthalenelithium and it is utilized in the presence of either diphenylethylene or α-methylstyrene.

13. A process for the polymerization of acrylic or methacrylic monomers comprising polymerizing said monomers in the presence of a polymerization initiating amount of an initiation system including (1) at least one functional initiator and (2) an alkali metal alcoholate, wherein said alcoholate has the formula:

$$R'OM'$$

in which M' is an alkali metal and R' has the formula:

$$R^1(OR^2)_m$$

in which $R^1$ is a linear or branched alkyl radical containing from 1 to 6 carbon atoms or an arylalkyl radical, $R^2$ is a linear or branched alkylene radical containing from 2 to 4 carbon atoms, and m is the integer 1, 2 or 3, to obtain a polymer having a percentage of syndiotactic triads higher than or equal to 80%.

14. The process according to claim 12, wherein said monomers are methyl methacrylate.

15. The process according to claim 12, carried out in the presence of a nonpolar solvent.

16. A process for the polymerization of acrylic, methacrylic, or nonacrylic vinyl monomers comprising polymerizing said monomers in the presence of a polymerization initiating amount of an initiation system including (1) at least one functional initiator and (2) an alkali metal alcoholate, wherein said alcoholate has the formula:

$$R'OM'$$

in which M' is an alkali metal and R' has the formula:

$$R^1(OR^2)_m$$

in which $R^1$ is a linear or branched alkyl radical containing from 1 to 6 carbon atoms or an arylalkyl radical, $R^2$ is a linear or branched alkylene radical containing from 2 to 4 carbon atoms, and m is the integer 1, 2 or 3, to obtain a star-shaped block copolymer.

17. The process according to claim 15, wherein said star-shaped block copolymer has the formula:

wherein, either:

PA is a polymer block originating from at least one monomer A selected from the group consisting of from nonacrylic vinyl and methacrylic monomers;

PB is a polymer block originating from at least one acrylic monomer B; and

PC is optionally present and is a polymer block originating from at least one methacrylic monomer C; or, PA and PC are each a polymer block originating from the same acrylic monomer; and PB is a polymer block originating from at least one monomer B selected from the group consisting of methacrylic monomers;

PD is a polymer block originating from at least one monomer D selected from the group consisting of nonacrylic vinyl and methacrylic monomers, and simultaneously PE is a polymer block originating from at least one acrylic monomer E; or else PD is a polymer block originating from at least one acrylic monomer D, and simultaneously PE is a polymer block originating from at least one methacrylic monomer E;

n is the number of branches of (PA-PB-PC) and is between 2 and 50 inclusive, and m is the number of branches of (PD-PE) and is between 0 and 18 inclusive, provided that the sum of n+m does not exceed the value of 50;

it being possible for each of the branches (PA-PB-PC) and (PD-PE) to comprise further only a single polymer block, in which case the two blocks are different, one being of an acrylic monomer and the other of a monomer selected from the group consisting of nonacrylic vinyl and methacrylic monomers; and X is a crosslinked nodule of at least one polymerized monomer consisting of a multifunctional cross-linking agent containing at least two polymerizable double bonds per molecule.

18. The process according to claim 16, which comprises:

(1) conducting anionic polymerization of at least one monomer A with the aid of said initiation system to obtain a living chain unit of the polymer block PA; and (2) reacting the living chain unit obtained in step (1) with at least one monomer B in order to obtain the living diblock copolymer (PA-PB); then (3) reacting the living diblock copolymer obtained in step (2) with at least one monomer C in order to obtain the living triblock copolymer (PA-PB-PC); step (3) optionally may be omitted and the process may be started by conducting step (1) with the monomer B, or optionally only one living block PA or PB or PC being formed;

(4) optionally forming a living diblock copolymer (PD-PE) by proceeding as in steps (1) and (2), but starting with at least one monomer D and at least one monomer E; or else forming a living block PD or PE by conducting step (1) with the monomers D or E;

(5) optionally mixing the living copolymer (PA-PB-PC) or (PA-PB) or (PB-PC) copolymer or the living block PA or PB or PC, with the living diblock copolymer (PD-PE) or the living block PD or PE obtained according to (4), in a medium which was used to conduct their polymerization by an anionic route, with at least one monomer Mr in a molar excess of 4 to 26 per active center, and the double bonds are deactivated by a reaction with a proton source selected from the group consisting of an alcohol, water and a protonic acid, and (6) optionally conducting a transesterification of the star-shaped copolymer in an acidic medium.

19. The process according to claim 15, wherein a star-shaped block copolymer of formula $(PA-PB)_n X$ is formed, in which PA and PB, which are identical or different, are each polymer blocks originating from primary, secondary or tertiary alkyl acrylate monomers or from methacrylic or nonacrylic vinyl monomers, one at least of the blocks being an acrylic block, and n is an integer between 2 and 50.

* * * * *